US 7,854,548 B2

(12) United States Patent
Sandnas et al.

(10) Patent No.: US 7,854,548 B2
(45) Date of Patent: Dec. 21, 2010

(54) INTEGRATED TOTAL AIR TEMPERATURE PROBE AND ELECTRONICS

(75) Inventors: Mathew L. Sandnas, Lakeville, MN (US); Glenn Austin, Minneapolis, MN (US); Mark J. Buenz, Prior Lake, MN (US); Daniel Teigen, Lonsdale, MN (US); Wade Williams, St. Paul, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 354 days.

(21) Appl. No.: 11/960,620

(22) Filed: Dec. 19, 2007

(65) Prior Publication Data
US 2008/0151963 A1    Jun. 26, 2008

Related U.S. Application Data

(60) Provisional application No. 60/870,716, filed on Dec. 19, 2006.

(51) Int. Cl.
*G01K 1/16* (2006.01)
*G01K 17/06* (2006.01)

(52) U.S. Cl. .................. 374/141; 374/44; 374/183; 374/163; 374/109; 374/29

(58) Field of Classification Search .......... 374/100, 374/114, 163, 183, 185, 179, 141, 29, 137, 374/112, 142, 143, 110, 109, 115, 138, 164, 374/16; 73/204.11, 202.5
See application file for complete search history.

(56) References Cited

U.S. PATENT DOCUMENTS

| | | | |
|---|---|---|---|
| 3,367,182 A * | 2/1968 | Baxter ........................ 374/29 |
| 5,001,638 A * | 3/1991 | Zimmerman et al. .......... 701/14 |
| 6,370,450 B1 | 4/2002 | Kromer et al. |
| 6,609,825 B2 * | 8/2003 | Ice et al. ..................... 374/138 |
| 6,622,556 B1 * | 9/2003 | May .......................... 73/202.5 |

(Continued)

FOREIGN PATENT DOCUMENTS

EP       1275947 A2       1/2003

(Continued)

OTHER PUBLICATIONS

PCT International Search Report from the USPTO for PCT/US2007/088226, mailed Jun. 11, 2008.

(Continued)

*Primary Examiner*—Gail Verbitsky
(74) *Attorney, Agent, or Firm*—Kevin O'Brien; Calfee, Halter & Griswold LLP

(57) ABSTRACT

A total air temperature sensor includes a probe secured to a first side of a vehicle surface. The probe includes an air inlet and a temperature sensing element. Air flows into the air inlet and passes by the temperature sensing element. The temperature sensing element produces a temperature sensing element electrical signal as a function of a temperature of the air. The total air temperature sensor also includes an electronics package secured to a second side of the vehicle surface. Electronics in the electronics package receive the temperature sensing element electrical signal from the temperature sensing element and determine a total air temperature as a function of the temperature sensing element electrical signal.

13 Claims, 5 Drawing Sheets

U.S. PATENT DOCUMENTS

| | | | |
|---|---|---|---|
| 6,644,849 B1 * | 11/2003 | Conner | 374/141 |
| 7,111,982 B1 * | 9/2006 | Swonger, Jr. | 374/143 |
| 7,416,329 B2 * | 8/2008 | Severson | 374/16 |
| 2003/0058919 A1 | 3/2003 | Ice et al. | |
| 2005/0193812 A1 | 9/2005 | Ice | |

FOREIGN PATENT DOCUMENTS

| | | | |
|---|---|---|---|
| EP | 1491900 A2 | 12/2004 | |
| EP | 1602905 A1 | 12/2005 | |

OTHER PUBLICATIONS

PCT Written Opinion of the International Searching Authority for PCT/US2007/088226, mailed Jun. 11, 2008.

* cited by examiner

INTEGRATED TOTAL AIR TEMPERATURE PROBE AND ELECTRONICS

This application claims the benefit of U.S. Provisional Application No. 60/870,716, filed Dec. 19, 2006, which is hereby incorporated by reference.

BACKGROUND

The present invention relates to a sensor for determining total air temperature. It finds particular application in conjunction with a total air temperature sensor including both an integrated probe and integrated electronics and will be described with particular reference thereto. It will be appreciated, however, that the invention is also amenable to other applications.

A total air temperature (TAT) sensor is used on an air vehicle (e.g., aircraft) to determine, for example, total temperature, true airspeed, Mach number, etc. of the air vehicle moving through an air mass. Current distributed air data architectures rely on TAT sensors with analog (resistance) outputs that are wired to an air data computer at a remote location onboard the air vehicle. In addition to calculating the total temperature, true airspeed, and Mach number of the air vehicle, the air data computer monitors and controls a heater on the TAT sensor for reducing the risk of ice formation.

The remote location of the air data computer requires circuitry, including cables, for transmitting the analog resistance outputs from the TAT sensor to the air data computer. Heated TAT sensors also require the air data computer or other devices to provide heater control and monitoring. Such circuits increase the size and complexity of the device containing these circuits (e.g., the air data computer). Transmitting signals along cables on the aircraft creates certain drawbacks. For example, signal loss tends to occur over the inter-connection cables. In addition, the inter-connection cables are susceptible to electrical noise, which may interfere with the transmitted signal. Also, the interface requirements between the inter-connection cables and the air data computer are relatively complex.

The present invention provides a new and improved apparatus and method which addresses the above-referenced problems.

SUMMARY

In one aspect of the present invention, a total air temperature sensor includes a probe secured to a first side of a vehicle surface. The probe includes an air inlet and a temperature sensing element. Air flows into the air inlet and passes by the temperature sensing element. The temperature sensing element produces a temperature sensing element electrical signal as a function of a temperature of the air. The total air temperature sensor also includes an electronics package secured to a second side of the vehicle surface. Electronics in the electronics package receive the temperature sensing element electrical signal from the temperature sensing element and determine a total air temperature as a function of the temperature sensing element electrical signal.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
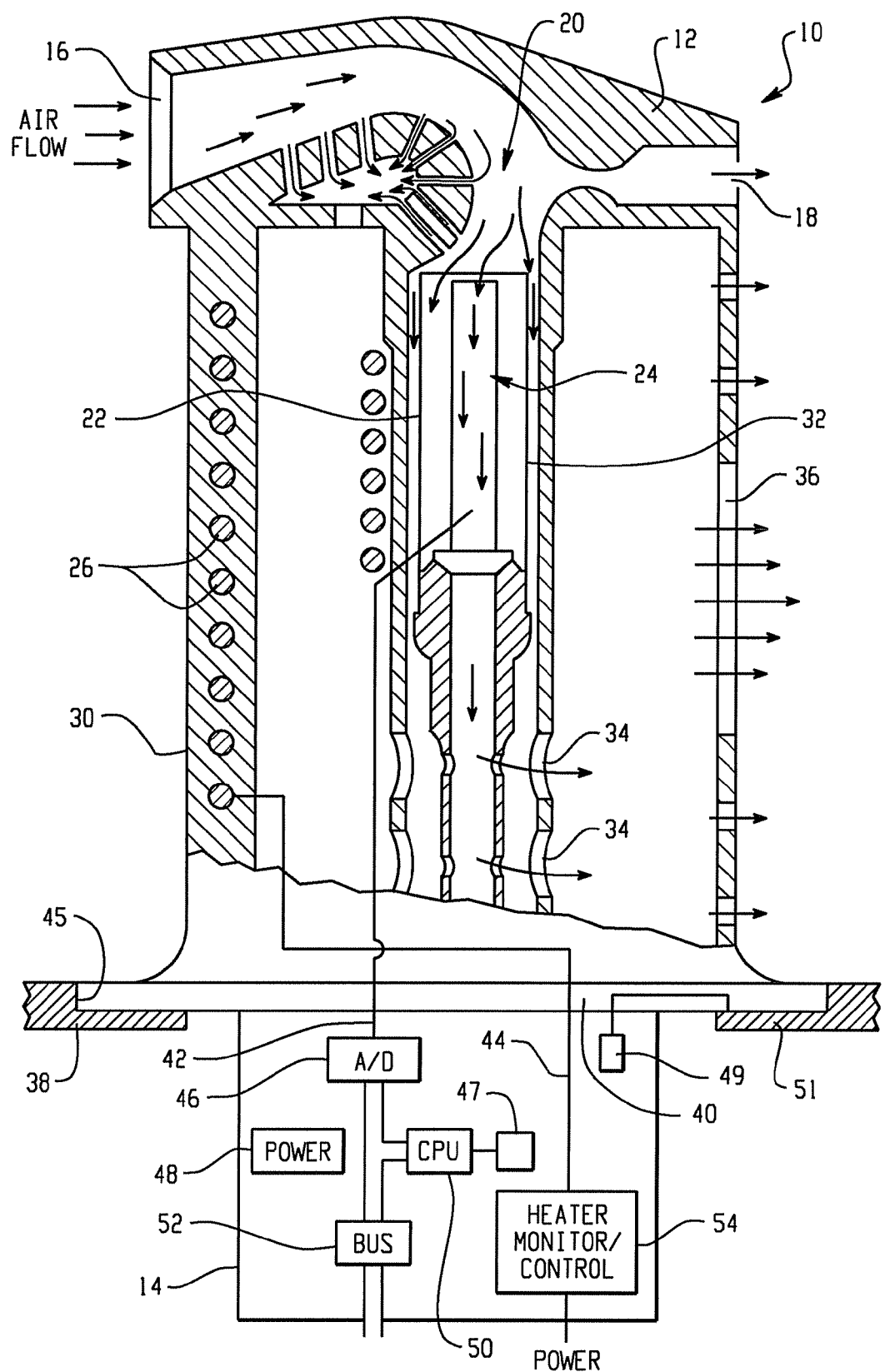
FIG. 1 illustrates a schematic representation of a total air temperature sensor in accordance with one embodiment of an apparatus illustrating principles of the present invention.

With reference to FIG. 1, a simplified component diagram of an exemplary total air temperature (TAT) sensor 10 is illustrated in accordance with one embodiment of the present invention. The TAT sensor 10 includes a probe 12 and an electronics package 14. In one embodiment, the probe 12 is integrated with the electronics package 14.

The probe 12 includes an air inlet 16, a main exit channel 18, a sensor flow passage 20, and a sensor assembly 22, which includes a thermometer or temperature sensing element 24 for sensing the temperature of the air in the sensor flow passage 20. A heater 26 is embedded in a housing 30 of the probe 12. In one embodiment, the heater 26 is used as a deicing heater. The temperature sensed by the sensing element 24 may be affected by the heater 26. Therefore, a radiation shield 32 (e.g., heat shield) is provided around the sensing element 24 to reduce sensing errors. A portion of the air entering the air inlet 16 exits the main exit channel 18 while another portion of the air enters the sensor flow passage 20. The temperature of the portion of air entering the sensor flow passage 20 is measured by the sensing element 24 before the air in the sensor flow passage 20 exits via respective ports 34, 36 in the sensor flow passage 20 and the housing 30.

An aircraft skin 38 (surface) supports the probe 12. More specifically, the sensor 10 is installed in a hole in the skin 38, attached directly to skin 38 itself or to a doubler plate (e.g., a structural reinforcement on the inside of the skin). In one embodiment, the skin 38 is a carbon composite material; however, other materials are contemplated for the aircraft skin 38 in other embodiments. A duct 40 provides a path for electrical connections 42, 44 (e.g., electrical wires) between the probe 12 and the electronics package 14, respectively. Until now, a metal skin has been the norm. However, aircraft skins made of carbon composites are becoming more popular. With carbon composites skins 38, keeping a temperature at an interface 45 between the sensor 10 (e.g., probe 12) and the carbon composite skin 38 to an acceptable temperature is necessary to avoid damage to the carbon composites. The acceptable temperature for carbon composite skins 38 (e.g., between about 60° C. and 90° C.) is lower than a traditional metal skin could endure. When electronics are installed near the skin 38 of the aircraft, the environmental and electromagnetic requirements are relatively more stringent than electronics bays and other locations where electronics are normally installed. For example, if the skin is no longer metal, a probe 12 that may be metal becomes an antenna for lightning strikes and, therefore, increased lightning protection is desired. It is contemplated that the integrated electronics 14 house such lightning protection 47.

The electronics package 14 includes an analog/digital converter 46, a power regulator 48, a central processing unit (CPU) 50, an I/O bus 52, a heater monitor/control device 54, and an end plate temperature sensor 49, which monitors a temperature of a base plate 51 of the sensor 10. In the illustrated embodiment, the base plate 51 contacts the aircraft skin 38. However, it is also contemplated that the base plate does not contact, but is near the aircraft skin 38. In one embodiment, the power regulator 48 regulates power to 15 VDC, 28 VDC, or 115 VAC. The I/O bus 52 is a communication bus such as a CAN Bus, ARINC429, or Flexray (over plastic fiber optic). The heater monitor/control device 54 either simply monitors operation of the heater 26 or both monitors and controls operation of the heater 26. In that regard, the heater monitor/control device 54 monitors the heater 26 by sensing an electrical current supplied to the heater 26 and controls current to the heater 26 via a switch operable by an operator of the vehicle to turn the heater 26 on/off, if the device 54 is acting only as a monitor device. The heater monitor/control device 54 controls the heater 26 by automatically turning the heater 26 on/off using aircraft configuration inputs (e.g., Weight on Wheels (WOW), airspeed, etc.), if the device 54 is also acting as a control device.

The analog/digital converter 46 electrically communicates with the temperature sensing element 24, which produces an analog signal as a function of (e.g., representative of) the air temperature in the sensor flow passage 20. The analog/digital converter 46 produces a digital signal as a function of the analog signal received from the sensing element 24. The digital signal is transmitted from the analog/digital converter 46 to the CPU 50 via the I/O bus 52. The CPU 50 also electrically communicates with the heater monitor/control device 54 for determining whether the heater 26 is on/off. The CPU 50 calculates the TAT as a function of at least the temperature sensed by the sensing element 24 and/or a status of the heater 26 (e.g., whether the heater 26 is on/off). More specifically, if the heater 26 is off, the CPU 50 determines that the TAT is the temperature sensed by the sensing element 24. On the other hand, if the heater 26 is on, the CPU 50 determines the TAT by, for example, multiplying the temperature sensed by the sensing element 24 by a constant.

The TAT is transmitted from the CPU 50 to other systems (not shown) on the aircraft via the bus I/O 52. For example, the TAT is transmitted from the CPU 50 to flight management computers, engine computers, air data computers, and/or other computing devices on the aircraft for determining true air speed, fuel efficiency, and/or engine settings, etc.

In one embodiment, the end plate sensor 49 electrically communicates with the CPU 50 and/or the heater monitor/control device 54 and causes the heater 26 and/or the sensing element 24 to turn-off once the heater 26 and/or the sensing element 24 rise above a predetermined threshold. Turning-off the sensing element 24 and/or the heater 26 above the predetermined threshold helps reduce the possibility that the skin 38 (e.g., carbon composite skin) will be damaged from overheating at the interface 45 between the base plate and the skin 38 when, for example, the aircraft is on the ground in a relatively warm environment. Typically, the sensing element 24 and/or the heater 26 will not need to be turned-off while the aircraft is in flight since the air passing over the skin 38 tends to cool the sensing element 24 and the heater 26.

Figure 2:
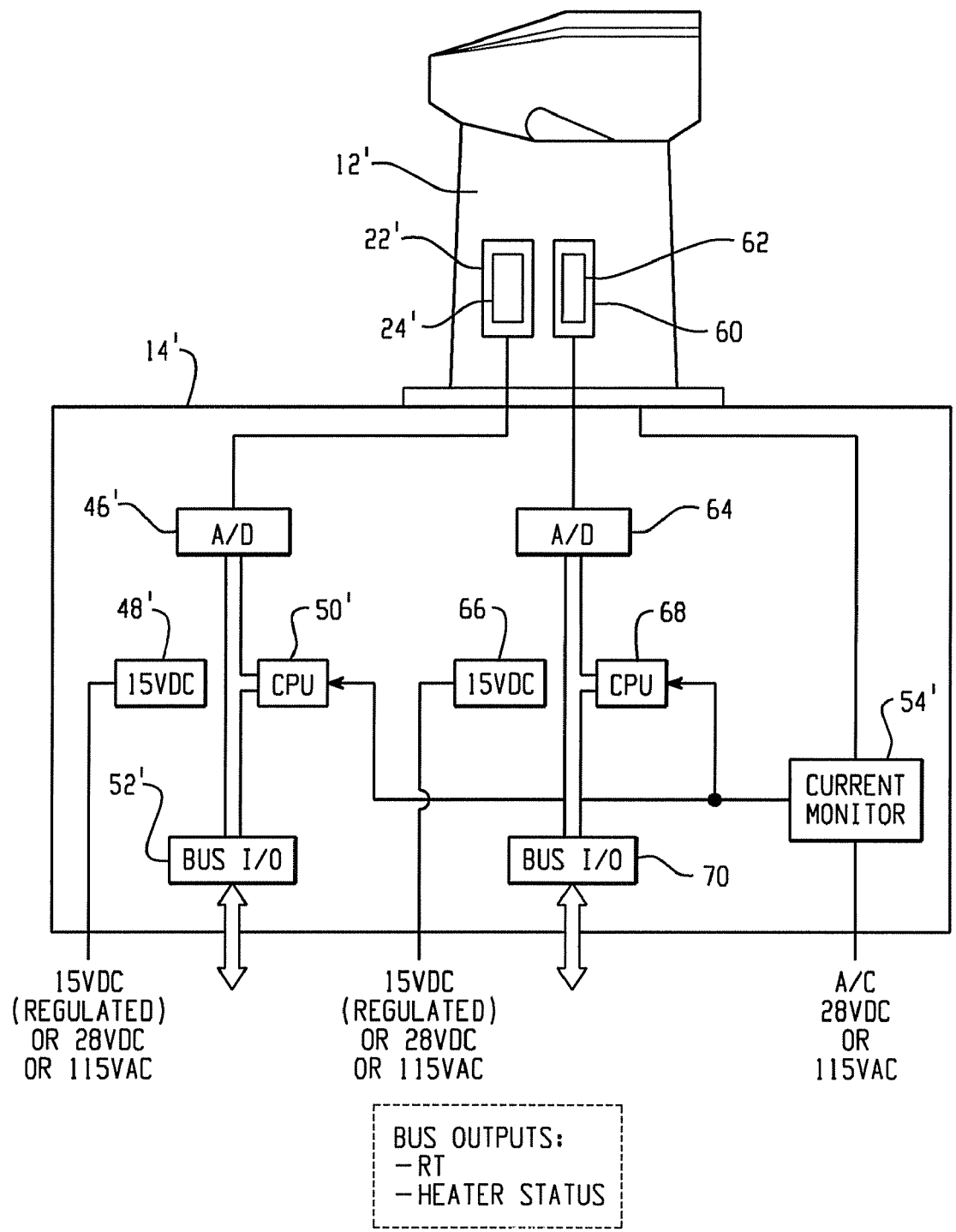
FIG. 2 illustrates a schematic representation of a total air temperature sensor in accordance with another embodiment of an apparatus illustrating principles of the present invention.

A second embodiment of the present invention is illustrated in FIG. 2. For ease of understanding this embodiment of the present invention, like components from FIG. 1 are designated by like numerals with a primed (') suffix and new components are designated by new numerals.

With reference to FIG. 2, the probe 12' includes a second sensor assembly 60, which includes a second thermometer or temperature sensing element 62 for sensing the temperature of air in the sensor flow passage.

The electronics package 14' includes the analog/digital converter 46', power regulator 48', CPU 50', I/O bus 52', and heater monitor/control device 54', which are electrically connected to the sensor assembly 22' as described above with reference to FIG. 1. In addition, the electronics package 14' also includes a second analog/digital converter 64, a second power regulator 66, a second CPU 68, and a second I/O bus 70, which are electrically connected to the second sensor assembly 60. The heater monitor/control device 54' is also electrically connected to the second sensor assembly 60.

As discussed above, the analog/digital converter 46' electrically communicates with the temperature sensing element 24', which produces an analog signal as a function of the air temperature in the sensor flow passage. The analog/digital converter 46' produces a digital signal as a function of the analog signal received from the sensing element 24'. The digital signal is transmitted from the analog/digital converter 46' to the CPU 50' via the I/O bus 52'. The CPU 50' also electrically communicates with the heater monitor/control device 54' for determining whether the heater is on/off. The CPU 50' calculates the TAT as a function of the temperature sensed by the sensing element 24' and whether the heater is on/off. More specifically, if the heater is off, the CPU 50' determines that the TAT is the temperature sensed by the sensing element 24'. On the other hand, if the heater is on, the CPU 50' determines the TAT by, for example, multiplying the temperature sensed by the sensing element 24' by a constant.

In addition, the analog/digital converter 64 electrically communicates with the second temperature sensing element 62, which produces an analog signal as a function of the air temperature in the sensor flow passage. The analog/digital converter 64 produces a digital signal as a function of the analog signal received from the sensing element 62. The digital signal is transmitted from the analog/digital converter 64 to the CPU 68 via the I/O bus 70. The CPU 68 also electrically communicates with the heater monitor/control device 54' for determining whether the heater is on/off. The CPU 68 calculates the TAT as a function of the temperature sensed by the sensing element 62 and whether the heater is on/off. More specifically, if the heater is off, the CPU 68 determines that the TAT is the temperature sensed by the sensing element 62. On the other hand, if the heater is on, the CPU 68 determines the TAT by, for example, multiplying the temperature sensed by the sensing element 62 by a constant.

In the illustrated embodiment, the analog/digital converter 46', power regulator 48', CPU 50', I/O bus 52', heater monitor/control device 54', and sensor assembly 22' are electrically independent from the second analog/digital converter 64, second power regulator 66, second CPU 68, and second I/O bus 70, and second sensor assembly 60. At the same time, the CPU 50' and second CPU 68 are both electrically connected to the heater monitor/control device 54'.

Figure 3:
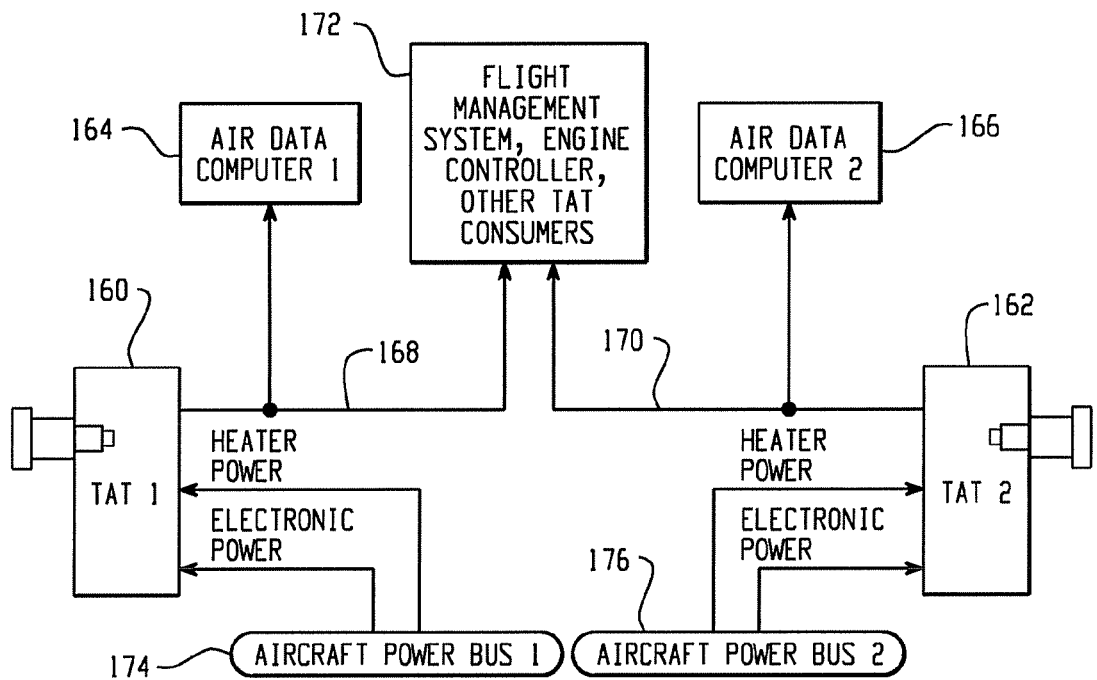
FIG. 3 illustrates single-channel TATs communicating with respective air data computers according to one embodiment of an apparatus illustrating principles of the present invention.

FIG. 3 illustrates single-channel TATs 160, 162 communicating with respective air data computers 164, 166 via respective data buses 168, 170. Both of the TATs 160, 162 also communicate with the aircraft Flight Management System (FMS), Engine Controller, and other TAT consumers, collectively represented as 172, via the respective data buses 168, 170. The TATs 160, 162 also receive heater power and electronic power via respective aircraft power buses 174, 176.

Figure 4:
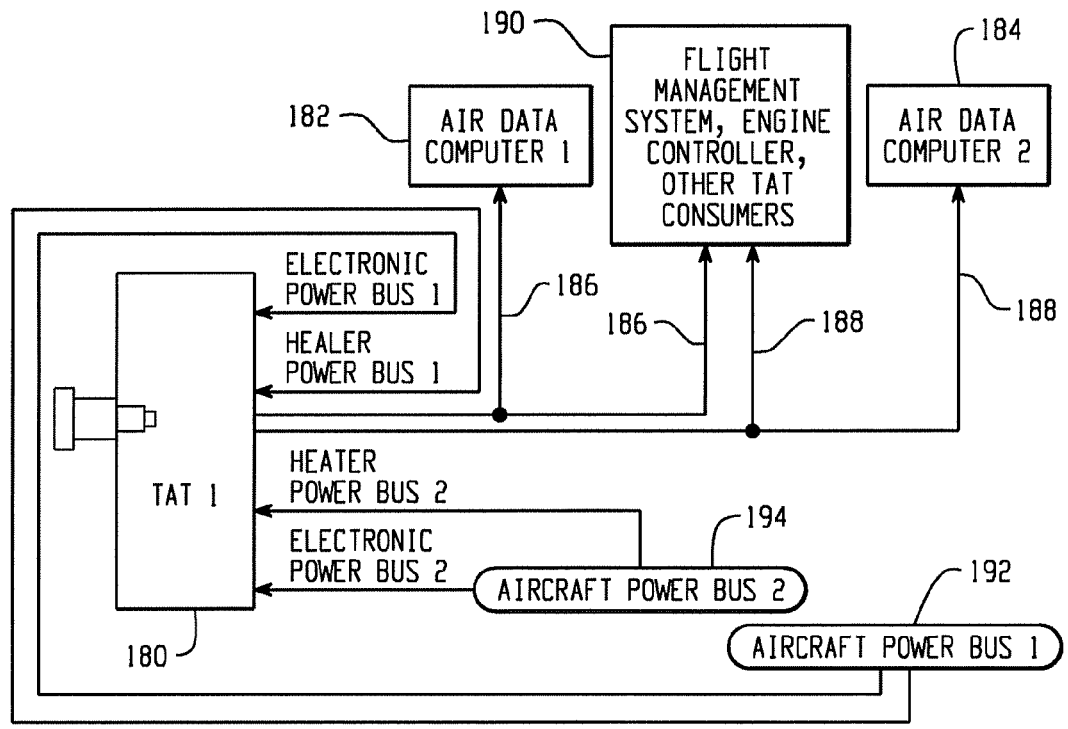
FIG. 4 illustrates a dual-channel TAT communicating with air data computers according to one embodiment of an apparatus illustrating principles of the present invention.

FIG. 4 illustrates a dual-channel TAT 180 communicating with air data computers 182, 184 via respective data buses 186, 188. The TAT 180 also communicates with the aircraft Flight Management System (FMS), Engine Controller, and other TAT consumers, collectively represented as 190, via the respective data buses 186, 188. The TAT 180 also receives first heater power and first electronic power via a first aircraft power bus 192. The TAT 180 also receives second heater power and second electronic power via a second aircraft power bus 194.

Figure 5:
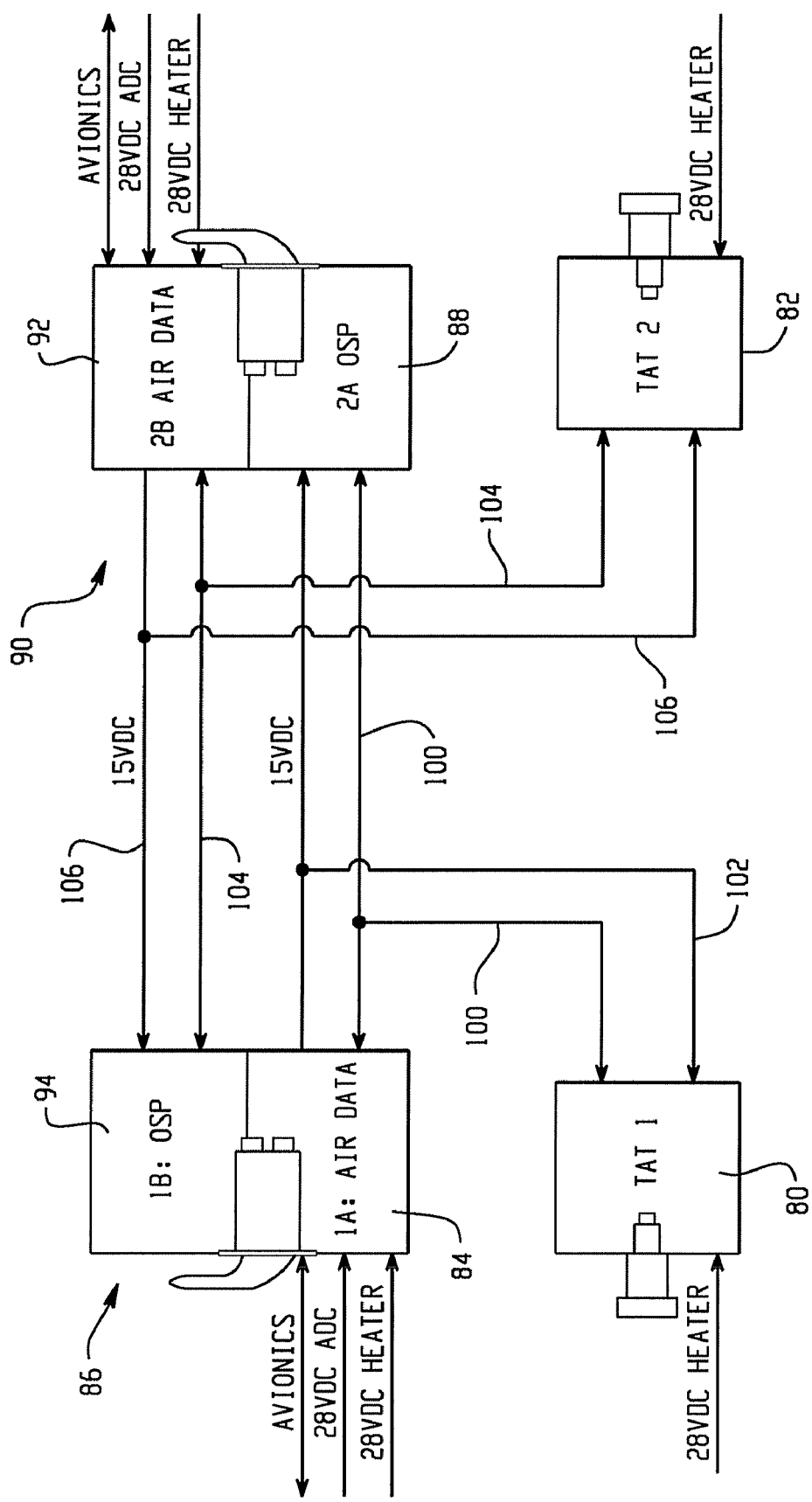
FIG. 5 illustrates a single-channel Integrated TAT integrated with an air data system according to the embodiment illustrated in FIG. 2.

FIG. 5 illustrates a single-channel TAT integrated into an air data system according to the embodiment illustrated in FIG. 2. In the illustrated embodiment, two (2) TAT sensors 80, 82 are positioned on opposite sides of an aircraft. Each of the TAT sensors 80, 82 operates as described above. The first TAT sensor 80 is electrically connected to an air data section 84 of a first computer 86, which is onboard the aircraft, and an opposite side pressure (OSP) section 88 of a second computer 90, which is also onboard the aircraft. The second TAT sensor 82 is electrically connected to an air data section 92 of the second computer 90 and an OSP section 94 of the first computer 86. Data is transmitted between i) the first TAT sensor 80 and ii) the air data section 84 of the first computer 86 and the OSP section 88 of the second computer 90 via a data line 100; and power is transmitted to the first TAT sensor 80 and the OSP section 88 of the second computer 90 from the air data section 84 of the first computer 86 via a power line 102. In addition, data is transmitted between i) the second TAT sensor 82 and ii) the air data section 92 of the second computer 90 and the OSP section 94 of the first computer 86 via a data line 104; and power is transmitted to the second TAT sensor 82 and the OSP section 94 of the first computer 86 from the air data section 92 of the second computer 90 via a power line 106.

Figure 6:
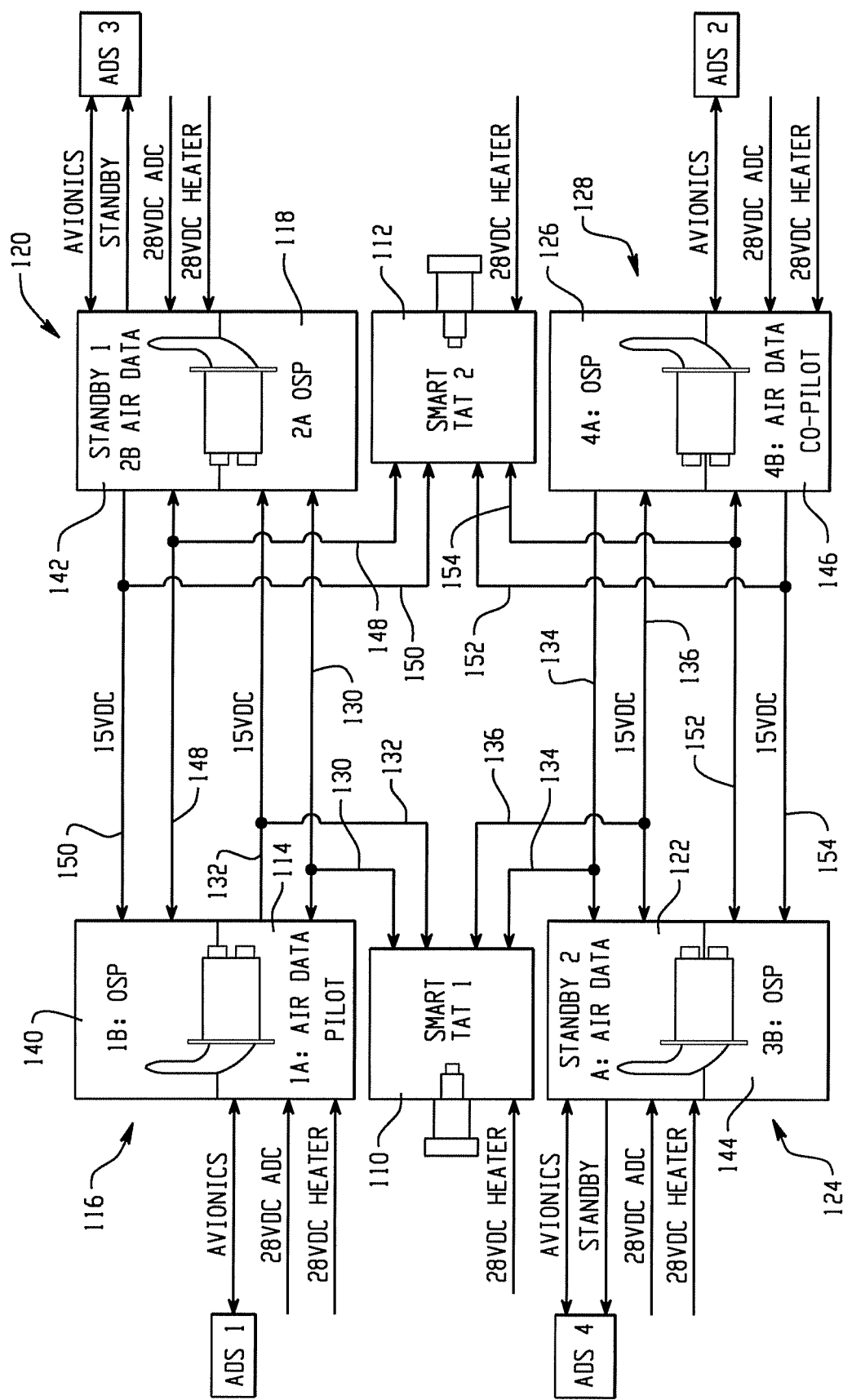
FIG. 6 illustrates a redundant dual-channel Integrated TAT integrated with an air data system according to the embodiment illustrated in FIG. 2.

FIG. 6 illustrates a dual channel redundant air data system according to the embodiment illustrated in FIG. 2. In the illustrated embodiment, two (2) TAT sensors 110, 112 are positioned on opposite sides of an aircraft. Each of the TAT sensors 110, 112 operates as described above. The first TAT sensor 110 is electrically connected to an air data section 114 of a Pilot computer 116, which is onboard the aircraft, and an OSP section 118 of a first standby computer 120, which is also onboard the aircraft. The first TAT sensor 110 is also electrically connected to an air data section 122 of a second standby computer 124, which is also onboard the aircraft, and an OSP section 126 of a Co-Pilot computer 128, which is also onboard the aircraft. Data is transmitted between i) the first TAT sensor 110 and ii) the air data section 114 of the Pilot computer 116 and the OSP section 118 of the first standby computer 120 via a data line 130; and power is transmitted to the first TAT sensor 110 and the OSP section 118 of the first standby computer 120 from the air data section 114 of the Pilot computer 116 via a power line 132. Data is transmitted between i) the first TAT sensor 110 and ii) the OSP section 126 of the Co-Pilot computer 128 and the air data section 122 of the second standby computer 124 via a data line 134; and power is transmitted to the first TAT sensor 110 and the OSP section 126 of the Co-Pilot computer 128 from the air data section 122 of the second standby computer 124 via a power line 126.

The second TAT sensor 112 is electrically connected to an OSP section 140 of the Pilot computer 116 and an air data section 142 of the first standby computer 120. The second TAT sensor 112 is also electrically connected to an OSP section 144 of the second standby computer 124 and an air data section 146 of the Co-Pilot computer 128. Data is transmitted between i) the second TAT sensor 112 and ii) the OSP section 140 of the Pilot computer 116 and the air data section 142 of the first standby computer 120 via a data line 148; and power is transmitted to the second TAT sensor 112 and the OSP section 140 of the Pilot computer 116 from the air data section 142 of the first standby computer 120 via a power line 150. Data is transmitted between i) the second TAT sensor 112 and ii) the air data section 146 of the Co-Pilot computer 128 and the OSP section 144 of the second standby computer 124 via a data line 152; and power is transmitted to the second TAT sensor 112 and the OSP section 144 of the second standby computer 124 from the air data section 146 of the Co-Pilot computer 128 via a power line 154.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A total air temperature sensor, comprising:
    a probe, the probe including:
       an air inlet; and
       a temperature sensing element, air flowing into the air inlet and passing by the temperature sensing element producing a temperature sensing element electrical signal as a function of a temperature of the air; and
    an electronics package, integrated with the probe, the electronics package including an interface temperature sensor for monitoring a temperature at an interface between the integrated probe and electronics package and the vehicle skin, electronics in the electronics package receiving the temperature sensing element electrical signal from the temperature sensing element and determining a total air temperature as a function of the temperature sensing element electrical signal.

2. The total air temperature sensor as set forth in claim 1, further including:
    an electrical conductor electrically communicating with the probe and electronics in the electronics package, the temperature sensing element electrical signal being communicated from the temperature sensing element to the electronics via the electrical conductor.

3. The total air temperature sensor as set forth in claim 1, wherein:
    the electronics produce an electronics electrical signal as a function of the total air temperature; and
    the electronics electrical signal is transmitted from the electronics to additional electrical systems on the vehicle for determining at least one of true air speed, fuel efficiency, and engine settings.

4. The total air temperature sensor as set forth in claim 1, the probe further including:
    a housing; and
    a heater for deicing the housing.

5. The total air temperature sensor as set forth in claim 4, wherein the electronics also determine the total air temperature as a function of a status of the heater.

6. The total air temperature sensor as set forth in claim 1, wherein:

the probe further includes:
   a second temperature sensing element producing a second temperature sensing element electrical signal as a function of the temperature of the air;
the electronics package includes:
   second electronics receiving the second temperature sensing element electrical signal from the second temperature sensing element and determining a second total air temperature as a function of the second temperature sensing element electrical signal.

7. The total air temperature sensor as set forth in claim 6, wherein:
   an electrical component in the electronics is electrically independent from a corresponding electrical component in the second electronics.

8. The total air temperature sensor as set forth in claim 6, wherein:
   the probe further includes:
     a housing; and
     a heater for deicing the housing;
   the electronics package further includes:
     a monitor monitoring a status of the heater;
   the monitor electrically communicates with an electrical component in the electronics and a corresponding electrical component in the second electronics; and
   the electronics and the second electronics also determine the total air temperature as a function of a status of the heater.

9. The total air temperature sensor as set forth in claim 1:
further including a second probe, including:
   a second air inlet; and
   a second temperature sensing element, air flowing into the second air inlet and passing by the second temperature sensing element producing a second temperature sensing element electrical signal as a function of the temperature of the air; and
further including a second electronics package integrated with the second probe, second electronics in the second electronics package receiving the second temperature sensing element electrical signal from the second temperature sensing element and determining a second total air temperature as a function of the second temperature sensing element electrical signal.

10. The total air temperature sensor as set forth in claim 9, wherein:
   the probe is mechanically and electrically independent of the second probe;
   the electronics are mechanically and electrically independent of the second electronics;
   the electronics electrically communicate with a first electronic computing device on the vehicle;
   the second electronics electrically communicate with a second electronic computing device on the vehicle; and
   the first electronic computing device is electrically independent of the second electronic computing device.

11. The total air temperature sensor as set forth in claim 1, wherein the integrated probe and electronics package is secured within a hole of a vehicle skin.

12. The total air temperature sensor as set forth in claim 11, wherein the vehicle skin is a carbon composite material.

13. The total air temperature sensor as set forth in claim 12, wherein at least one of a heater in a housing of the probe and the temperature sensing element are turned-off if the temperature at the interface is above a predetermined threshold.

\* \* \* \* \*